J. McDONALD.
WIRE TWISTING TOOL.
APPLICATION FILED MAY 19, 1919.
1,347,282.
Patented July 20, 1920.
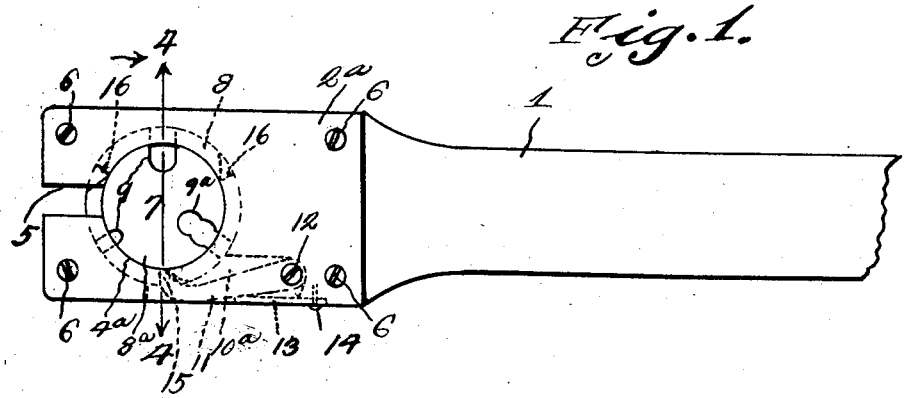
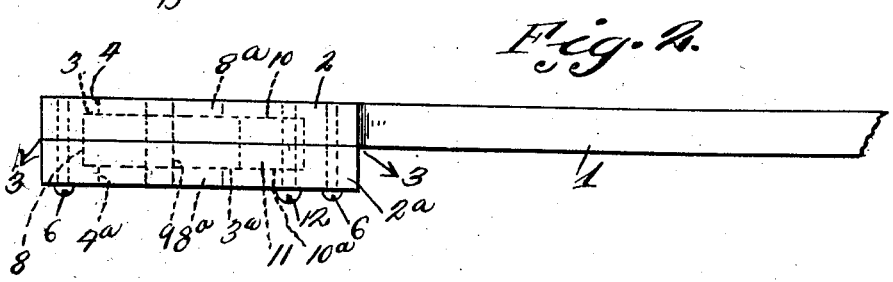
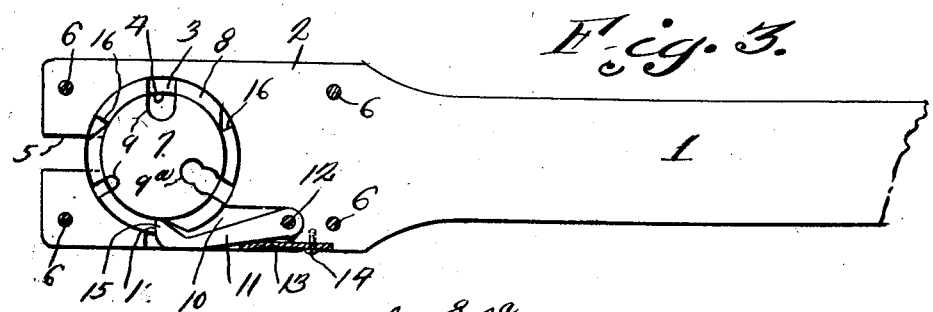
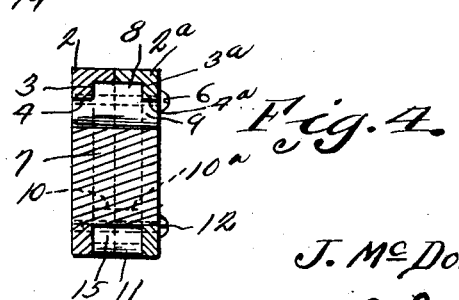
Inventor
J. McDonald
By D. Swift
His Attorney

UNITED STATES PATENT OFFICE.

JOHN McDONALD, OF WEST HAVEN, CONNECTICUT.

WIRE-TWISTING TOOL.

1,347,282.  Specification of Letters Patent.  Patented July 20, 1920.

Application filed May 19, 1919. Serial No. 298,164.

*To all whom it may concern:*

Be it known that I, JOHN MCDONALD, a citizen of the United States, residing at West Haven, in the county of New Haven, State of Connecticut, have invented a new and useful Wire-Twisting Tool; and I do hereby declare the following to be a full, clear, and exact description of the invention, such as will enable others skilled in the art to which it appertains to make and use the same.

The invention relates to wire twisting tools and has for its object to provide a tool of this character which will be light and simple and if so desired may be made as an integral part of other tools.

A further object is to provide a tool for twisting wire wherein a disk is rotated intermittently, said disk having a series of radial slots of various sizes and shapes. The disk being rotatably mounted within a tool head, said tool head having an opening through which the wire may be passed so that the same may be disposed in the radial slots of the intermittently rotatable disk.

A further object is to provide the handle members with depressions, said depressions being provided with centrally disposed round apertures, said apertures being in registration with each other and adapted to receive bosses on either side of the rotatable disk, said disk being rotatable in said apertures and depressions and to provide spring actuated means whereby the disks may be intermittently revolved.

With the above and other objects in view, the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a side elevation of the wire twister.

Fig. 2 is a top plan view of the same.

Fig. 3 is a sectional view taken on line 3—3 of Fig. 2, showing one face plate removed.

Fig. 4 is a sectional view taken on line 4—4 of Fig. 1.

Referring to the drawings, the numeral 1 designates a handle member, one end of which is provided with a rectangular portion 2, the rectangular portion 2 is provided with a depression 3, which depression is round and has a centrally disposed round opening 4, which extends through the member 2, there being an opening 5 which extends from the end of the member 2 to the round aperture 4. Secured by means of bolts 6 to the rectangular member 2 is a rectangular member $2^a$, which rectangular member $2^a$ is provided with a depression $3^a$ round in shape and centrally disposed therein is a round aperture $4^a$, said apertures and depressions in the members 2 and $2^a$ being so positioned that when they are secured together by means of the screws 6 they register with each other. Disposed in the chambers formed by the depressions and apertures is a rotatable disk 7, said disk being provided with bosses $8^a$, which are disposed in the apertures 4 and $4^a$, said apertures forming bearings for said rotatable disk, and said disk is provided with a flange portion 8 which is engaged by the depressions 3 and $3^a$ and is adapted to rotate therein. The disk 7 is provided with a series of radially disposed slots 9 and $9^a$, which slots may be of different width and adapted to receive various sizes of wire, when the wire is passed through the slot 5 and into the radial slots. The slot $9^a$ is formed with concave walls as shown to be used where the wires are being joined with what is known as a sleeve, which is an integrally joined member comprising two tubular sections made of soft metal into which the ends of the wires are inserted before being twisted. It will be noted that after the wire is passed through the opening 5 and into one of the openings 9 in the rotatable disk 7 that a rotation of the handle member upwardly will cause the slot 9 to be thrown out of registration with the opening 5, thereby preventing the displacement of the wire within said slot.

Rectangular members 2 and 3 are provided with depressions 10 and $10^a$, which depressions when brought together form a chamber in which dog 11 is pivoted as at 12, there being a leaf spring 13 secured as at 14 to the body portion 2, the end of said leaf spring engaging the pivoted dog 11 and maintaining the nose 15 thereof in engagement with the flange 8 of the rotatable disk 7. The flange 8 of the rotatable disk is provided with a series of depressions 16 which are adapted to be coöperated with by the nose 15 of the pivoted dog 11, which coöperation as the handle member 1 and 2 is moved upwardly and downwardly will impart an intermittent rotation to the disk 7, which intermittent rotation will cause the wires which extend through the slots 9 or 9ª to be twisted upon themselves.

It will be seen that a wire twister is provided which is compact and if so desired may be formed as an integral part of a pair of wire workers or lineman's pliers.

The invention having been set forth what is claimed as new and useful is:—

1. A wire twisting tool comprising a body member having a chamber therein, a rotatable wire twisting disk rotatably mounted in said chamber, there being radially disposed wire receiving notches in the disk, and equally spaced apart, a ratchet tooth disposed between each wire receiving notch, there being a slot in the tool head for the reception of a wire and passage of the wire to a radial notch of the disk, a pivoted spring actuated dog adapted to coöperate with the ratchet teeth, said ratchet teeth, wire receiving slot in the tool head, and radial notches being so positioned that during a wire twisting operation the radial notches will be out of registration with the slot in the end of the tool head.

2. A wire twisting tool comprising a handle member having a head thereon, said head having a depression therein provided with a centrally disposed round aperture, a detachable plate secured to said head and provided with a depression and round aperture in registration with the depression and aperture of the tool head, registering slots extending from the apertures to the end of the tool, a rotatable disk mounted in the depressions of the head and plate, said disk being provided with bosses, said bosses having bearings in the round openings of the head and plate, radial slots for the reception of wires, said slots being carried by said disk, chambers in the tool head and plate thereby forming a chamber, a spring actuated dog pivoted in said chamber, notches carried by the periphery of the rotatable disk and adapted to be coöperated with by the pivoted dog so that an intermittent rotation may be imparted to the disk when an oscillatory movement is imparted to the tool handle, said notches being so positioned in relation to the radial slots and wire receiving slot in the tool head that during a twisting operation they will be out of registration.

In testimony whereof I have signed my name to this specification in the presence of two subscribing witnesses.

JOHN McDONALD.

Witnesses:
 THEO. H. SMITH,
 E. C. DALY.